Nov. 6, 1951  S. D. VIGREN ET AL  2,574,134
CONTACT SPRING ASSEMBLY OR THE LIKE AND
METHOD OF PRODUCING THE SAME
Filed June 4, 1946

INVENTORS
STEN DANIEL VIGREN AND
NILS EVERT FRIDOLF HOLMQVIST

BY Richardson, David and Nordon
Their ATTORNEYS.

Patented Nov. 6, 1951

2,574,134

UNITED STATES PATENT OFFICE 2,574,134

CONTACT SPRING ASSEMBLY OR THE LIKE AND METHOD OF PRODUCING THE SAME

Sten Daniel Vigren and Nils Evert Fridolf Holmqvist, Stockholm, Sweden

Application June 4, 1946, Serial No. 674,340
In Sweden June 13, 1945

3 Claims. (Cl. 200—166)

1

The invention relates to a method for producing spring assemblies for electric switching devices, interconnecting strips and relays.

Spring mountings are known which are assembled by arranging the springs at the desired spacing with the holes therein in alignment and by inserting an insulating bushing in said holes whereupon a solid pin is forced into said bushing thereby causing the bushing to expand and grip said springs.

By means of the method according to the present invention the manufacturing of contact spring assemblies is further simplified, the said solid pin and the whole operation undertaken with the said pin being avoided. The springs are first provided with at least one set of non-circular holes the edges of which have saw tooth shaped projections; they are thereupon arranged at the desired spacing with the holes of each set therein in alignment and an insulating rod of non-circular section of another form than that of the contour of said holes and having at least a surface of a material, which is not as hard as the spring material, is further inserted in each of the said sets of holes and then turned around its axis so as to cause the saw tooth shaped projections of the edges of the non-circular holes by means of sawing action to penetrate into the rod thus fixing the springs to the rod. The invention is thus thereby distinguished from the known method that the insulating rod as well as the springs are at the same time tools as well as an insulating and spacing and sawing organ respectively.

The above mentioned and other features of the invention will readily appear from the following description made with reference to the accompanying drawings, comprising Figs. 1-5. These show a spring assembly manufactured according to the invention and different steps of this manufacturing method.

Figure 1:
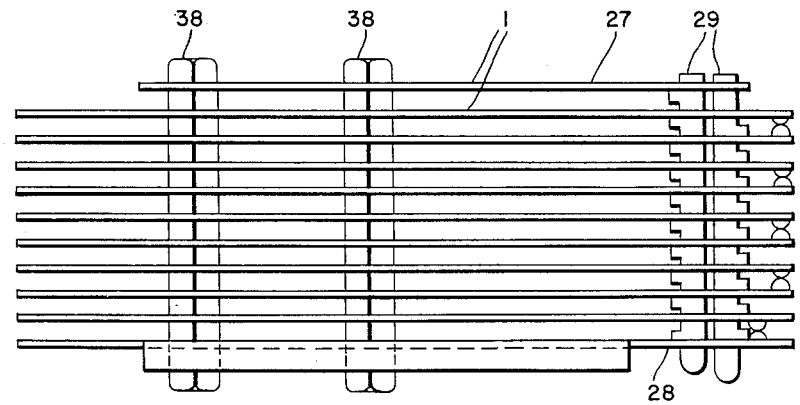

Fig. 1 is a side elevation of a relay spring assembly, while Figs. 2 to 5 show a detail of different embodiments of a spring with the insulating rod before and after it has been turned into its securing position.

Figure 4:
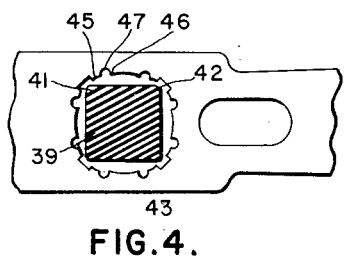
Figure 2:
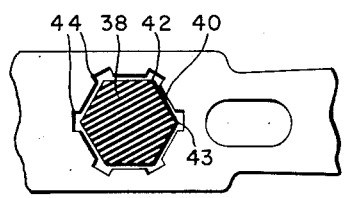

Referring now to said Figs. 1-5 each of the contact springs 1 shown in the drawing is formed with two holes having a polygonic contour In Figures 2 and 4 the form of such a hole is shown in different embodiments. A fixing spring 27 at the top of, and a spring 28 under the assembly are similarly formed. They mainly serve as supports for a stationary stud 29 adapted to fix the

2 contact making end of the immovable spring in known manner.

The spring assembly is held together by means of two similar rods 31 of insulating material. On account of the similarity it will be sufficient to describe the forming and the insertion only of one of these rods.

The contact and fixing springs are thus first arranged at the desired spacing with the holes in alignment whereupon a rod 38 or 39 is inserted through the said holes. The holes have a non-circular contour and their edges have saw tooth shaped projections. The outer contour of the cross section of the rod 38 or 39 is also non-circular but has another form than that of the said holes. The position of the rod 38 or 39 having thus been inserted in the holes is shown in Fig. 2 and Fig. 4 and is indicated by 40 and 41 respectively. The rod 38 or 39 may be formed with a central axial boring the cross section of which may for instance be square. This boring may partly serve as a guidance for a square formed pin, by means of which the rod 38 or 39 may be turned, partly as a hole through which a securing screw for the spring assembly may be inserted. When the rod is turned to the position shown in Figs. 3 and 5 the saw tooth shaped projections of the edges of the holes of the different springs penetrate into the rod thereby securing the springs in their positions.

To facilitate the inserting of the rod it is preferably sloped off at its ends. Above and below the spring assembly are provided plates, which are formed with holes for the rods in order to secure them against any unintentional turning. There may also be arranged other plates, which may be arranged at the sides of the spring assembly so as to prevent soldering tin or the like to penetrate between the contact springs.

The rods may be readily produced by molding and in the form of molded lengths, which then are cut off in portions of desired length.

The position taken up by the rod before it is turned is, as already mentioned, indicated by 40 in Fig. 2 and 41 in Fig. 4. In order to secure the springs to the rod it is turned an angle preferably equal to half the angle between the projecting corners 42 and 43 of the rod cross section in question (Figs. 2 and 4).

The holes of the springs 1, are provided with inwardly directed projections or tags 44, 45, 46, which easily penetrate into the rod, when the rod is turned. This makes it possible to use rods of a relatively hard material, e. g. Bakelite.

Figure 5:
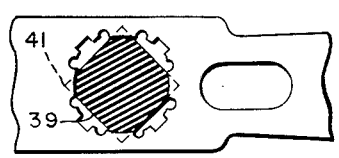
Figure 3:
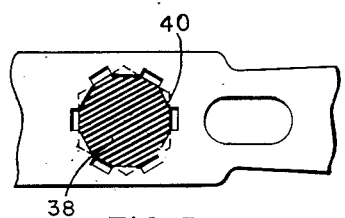

The inwardly directed projections also may be arranged in steps, which successively enter the rod during its turning. In Figs. 4 and 5 the projections 45 and 46 represent two step-like tags. Between these projections is formed a recess 47, which gives room for chips formed from the projection 46 during the turning of the rod.

The spring carrying and holding rods may be manufactured from any suitable insulating material, which can endure the forces arising from its turning and to endure the pressing and bending forces produced by securing screws or other devices without any appreciable deformations.

A suitable design of the insulating rod is obtained when the rod consists of an axial core of relatively hard material, preferably of metal, and a covering of insulating material surrounding this core.

We claim:

1. A method of assembling a plurality of contact springs, each of which is provided with at least one hole of non-circular contour, the edges of which have saw tooth shaped projections, comprising arranging said springs at the desired spacing, with the holes therein in alignment, inserting in said holes an insulating rod of non-circular cross-section of another form than that of the contour of the said holes, said rod having at least the surface portions thereof formed of a material which is softer than the material of said springs, and turning said rod around its axis so as to cause the saw tooth shaped projections of the edges of the non-circular holes in said springs to penetrate, by means of sawing action, into said rod, thus securely fixing said springs to said insulating rods.

2. A method as defined in claim 1 wherein the insulating rod which is inserted into said aligned non-circular holes is provided with a non-circular hole therein, in at least one end thereof.

3. A contact spring assembly which comprises a plurality of contact springs, said contact springs having non-circular holes therein, the edges of which have saw tooth shaped projections, and an insulating rod of a non-circular cross-section of another form than that of the contour of the said holes, said insulating rod being positioned in said holes in said contact springs so that the axis of its non-circular cross-section is rotated through an angle with reference to the corresponding axis of said non-circular holes in said contact springs, whereby said contact springs are held in spaced relation by the protrusion of the saw tooth shaped projections of the edges of said non-circular holes therein into said rod.

STEN DANIEL VIGREN.
NILS EVERT FRIDOLF HOLMQVIST.

REFERENCES CITED

The following references are of record in the file of this patent:

UNITED STATES PATENTS

| Number | Name | Date |
|---|---|---|
| 1,977,299 | Bates | Oct. 16, 1934 |
| 2,172,927 | Andeen | Sept. 12, 1939 |
| 2,177,377 | Polivka | Oct. 24, 1939 |
| 2,277,443 | Livingston | Mar. 24, 1942 |
| 2,312,408 | Hansen | Mar. 2, 1943 |
| 2,350,887 | Goff | June 6, 1944 |
| 2,395,300 | Slauson | Feb. 19, 1946 |